US008095409B2

(12) United States Patent
Swanson

(10) Patent No.: US 8,095,409 B2
(45) Date of Patent: Jan. 10, 2012

(54) METHODS AND PROGRAM PRODUCTS FOR ORGANIZING VIRTUAL MEETINGS

(75) Inventor: Jon Swanson, Queensbury, NY (US)

(73) Assignee: Insors Integrated Communications, Chicago, IL (US)

( * ) Notice: Subject to any disclaimer, the term of this patent is extended or adjusted under 35 U.S.C. 154(b) by 2394 days.

(21) Appl. No.: 10/728,408

(22) Filed: Dec. 5, 2003

(65) Prior Publication Data

US 2004/0117446 A1    Jun. 17, 2004

Related U.S. Application Data

(60) Provisional application No. 60/431,600, filed on Dec. 6, 2002.

(51) Int. Cl.
*G06Q 10/00* (2006.01)
*G06F 15/16* (2006.01)
*G06F 15/173* (2006.01)
*H04L 12/16* (2006.01)
*H04Q 11/00* (2006.01)

(52) U.S. Cl. ........ 705/7.19; 709/204; 709/226; 370/260

(58) Field of Classification Search .................. 709/204, 709/226; 705/7.19, 8; 370/260
See application file for complete search history.

(56) References Cited

U.S. PATENT DOCUMENTS

| | | | | |
|---|---|---|---|---|
| 4,635,251 A | * | 1/1987 | Stanley et al. | 370/261 |
| 4,796,293 A | * | 1/1989 | Blinken et al. | 379/202.01 |
| 5,109,384 A | * | 4/1992 | Tseung | 714/748 |
| 5,369,694 A | * | 11/1994 | Bales et al. | 379/206.01 |
| 5,422,883 A | * | 6/1995 | Hauris et al. | 370/261 |
| 5,506,954 A | | 4/1996 | Arshi et al. | |
| 5,508,732 A | | 4/1996 | Bottomley et al. | |
| 5,680,392 A | * | 10/1997 | Semaan | 370/261 |
| 5,758,079 A | | 5/1998 | Ludwig et al. | |
| 5,784,561 A | * | 7/1998 | Bruno et al. | 709/204 |
| 5,838,914 A | | 11/1998 | Carleton et al. | |
| 5,844,973 A | * | 12/1998 | Venkatraman et al. | 379/127.05 |
| 5,867,156 A | | 2/1999 | Beard et al. | |
| 5,870,547 A | | 2/1999 | Pommier et al. | |
| 5,872,923 A | | 2/1999 | Schwartz et al. | |
| 5,874,960 A | | 2/1999 | Mairs et al. | |
| 5,889,946 A | | 3/1999 | FitzPatrick et al. | |
| 5,903,629 A | * | 5/1999 | Campbell et al. | 379/88.24 |
| 5,915,908 A | | 6/1999 | Beutler | |

(Continued)

OTHER PUBLICATIONS

A. Gupta, W. Howe, M. Moran, and Q. Nguyen, "Resource sharing for multi-party real-time communication", Proc. IEEE INFOCOM'95, pp. 1995.*

(Continued)

*Primary Examiner* — Beth V Boswell
*Assistant Examiner* — Folashade Anderson
(74) *Attorney, Agent, or Firm* — Greer, Burns & Crain, Ltd.

(57) ABSTRACT

A method for organizing a virtual meeting includes steps of creating a meeting file, the meeting file including at least a meeting date, a meeting start time, a meeting duration time, and a meeting code. The meeting file is stored on a memory accessible to the network, and at least one attendee is specified. A step of communicating a meeting invitation to the at least one attendee is also performed, with the invitation including at least the meeting date, meeting start time, meeting code, and a meeting entry portal. Methods and systems of the invention may be embodied in computers and computer program products.

31 Claims, 5 Drawing Sheets

U.S. PATENT DOCUMENTS

| | | | | |
|---|---|---|---|---|
| 5,923,844 | A | 7/1999 | Pommier et al. | |
| 5,938,724 | A | 8/1999 | Pommier et al. | |
| 5,944,785 | A | 8/1999 | Pommier et al. | |
| 5,948,022 | A | 9/1999 | Carleton et al. | |
| 5,948,056 | A | 9/1999 | Mizuno et al. | |
| 5,949,975 | A | 9/1999 | Batty et al. | |
| 5,991,385 | A | 11/1999 | Dunn et al. | |
| 5,995,096 | A | 11/1999 | Kitahara et al. | |
| 6,025,871 | A | 2/2000 | Kantor et al. | |
| 6,047,314 | A | 4/2000 | Pommier et al. | |
| 6,078,948 | A | 6/2000 | Podgorny et al. | |
| 6,081,513 | A * | 6/2000 | Roy | 370/260 |
| 6,115,027 | A | 9/2000 | Hao et al. | |
| 6,151,020 | A | 11/2000 | Palmer et al. | |
| 6,201,859 | B1 | 3/2001 | Memhard et al. | |
| 6,204,847 | B1 | 3/2001 | Wright | |
| 6,216,177 | B1 | 4/2001 | Mairs et al. | |
| 6,253,167 | B1 | 6/2001 | Matsuda et al. | |
| 6,268,855 | B1 | 7/2001 | Mairs et al. | |
| 6,271,839 | B1 | 8/2001 | Mairs et al. | |
| 6,282,206 | B1 | 8/2001 | Hindus et al. | |
| 6,285,363 | B1 | 9/2001 | Mairs et al. | |
| 6,288,739 | B1 * | 9/2001 | Hales et al. | 348/14.07 |
| 6,292,166 | B1 | 9/2001 | Palmer et al. | |
| 6,329,984 | B1 | 12/2001 | Boss et al. | |
| 6,363,352 | B1 * | 3/2002 | Dailey et al. | 705/9 |
| 6,418,214 | B1 * | 7/2002 | Smythe et al. | 379/202.01 |
| 6,421,047 | B1 | 7/2002 | de Groot | |
| 6,442,758 | B1 | 8/2002 | Jang et al. | |
| 6,526,281 | B1 * | 2/2003 | Gorsuch et al. | 455/452.1 |
| 6,594,265 | B1 * | 7/2003 | Fichou et al. | 370/395.51 |
| 6,606,297 | B1 * | 8/2003 | Magill et al. | 370/216 |
| 6,636,888 | B1 * | 10/2003 | Bookspan et al. | 709/203 |
| 6,677,979 | B1 | 1/2004 | Westfield | 348/14.12 |
| 6,760,749 | B1 | 7/2004 | Dunlap et al. | |
| 6,775,247 | B1 | 8/2004 | Shaffer et al. | |
| 6,915,336 | B1 * | 7/2005 | Hankejh et al. | 709/219 |
| 6,922,718 | B2 * | 7/2005 | Chang | 709/204 |
| 7,035,230 | B1 * | 4/2006 | Shaffer et al. | 370/261 |
| 7,149,288 | B2 * | 12/2006 | Digate et al. | 379/88.17 |
| 7,151,762 | B1 | 12/2006 | Ho et al. | |
| 7,167,552 | B1 | 1/2007 | Shaffer et al. | |
| 7,193,996 | B2 | 3/2007 | Dobbins et al. | |
| 7,213,050 | B1 * | 5/2007 | Shaffer et al. | 709/204 |
| 7,215,647 | B2 * | 5/2007 | Wilson | 370/261 |
| 7,225,459 | B2 | 5/2007 | Magliaro | |
| 7,233,933 | B2 * | 6/2007 | Horvitz et al. | 706/21 |
| 7,353,252 | B1 * | 4/2008 | Yang et al. | 709/204 |
| 7,613,137 | B2 * | 11/2009 | Swanson et al. | 370/260 |
| 7,627,629 | B1 * | 12/2009 | Wu et al. | 709/204 |
| 7,639,633 | B2 * | 12/2009 | Hollins et al. | 370/260 |
| 7,707,296 | B2 * | 4/2010 | de Oliveira | 709/229 |
| 2001/0043571 | A1 | 11/2001 | Jang et al. | |
| 2002/0133473 | A1 | 9/2002 | Grande et al. | |
| 2003/0014488 | A1 * | 1/2003 | Dalal et al. | 709/204 |
| 2003/0105820 | A1 * | 6/2003 | Haims et al. | 709/205 |
| 2004/0111472 | A1 | 6/2004 | Swanson et al. | |
| 2004/0117446 | A1 | 6/2004 | Swanson | |
| 2004/0236593 | A1 | 11/2004 | Swanson et al. | |
| 2004/0249967 | A1 | 12/2004 | Swanson | |
| 2005/0058088 | A1 * | 3/2005 | Decker et al. | 370/260 |
| 2005/0232151 | A1 | 10/2005 | Chapweske et al. | |
| 2005/0237377 | A1 | 10/2005 | Chapweske et al. | |

OTHER PUBLICATIONS

Polycom, "Guide to Conferencing and Collaboration", (2003), p. 2-9.
Intercall, "MeetingCenter", www.intercall.com (believed published circa 2003).
Tanberg, Tanberg Scheduler: Videoconference Scheduling and Room Reservation, www.tanberg.net (Jul. 2002).
Latitude Communications Inc., "Meeting Place Web 4.0", www.meetingplace.net (2003).
Jennifer Teig von Hoffman, "How to Start up an Access Grid Node Using Virtual Venues", (2001), p. 1-12.
Access Grid, "The Access Grid Project", www.accessgrid.org (believed published circa 2001).
Jennifer Teig von Hoffman, "Beginner's Guide to Facilitating Interactive Communications on the Access Grid," (2002), p. 1-18.
Jennifer Teig von Hoffman, "Guide to Distributed PowerPoint", (2001), p. 1-14.
RADVision, "IP Centric Conferencing", (2001) p. 1-14.
Wainhouse Research, "Will Your Next Video Bridge Be Software-Based?" Examining a Next-Generation Software-Based Video Conference Server, (2003) p. 1-10.
ClearOne, "A Guide to Multipoint Conferencing", (2002) p. 1-24.
Sonexis, "Evaluating Conferencing Solutions", A Buyer's Guide, p. 1-22.
Sprint, "How Businesses Can Get the Most Out of Conferencing and Collaboration Tools", (2002) p. 1-14.
Timothy M. O'Neil, Polycom, Inc., "Demystifying IP Migration for IT Professionals", (2003) p. 1-15.
Ian Foster et al. "A Distributed Resource Management Architecture that Supports Advance Reservations and Co-Allocation," published on the World Wide Web at http://www.globus.org/alliance/publications/papers/iwgos.pdf#search=%22a%20distributed%20resource%20management%20architecture%20 (1999).
Warren Smith, Ian Foster, Valerie Taylor, "Scheduling with Advanced Reservations," International Parallel and Distributed Processing Symposium (IPDPS '00), (2000).

* cited by examiner

METHODS AND PROGRAM PRODUCTS FOR ORGANIZING VIRTUAL MEETINGS

CROSS REFERENCE AND CLAIM FOR PRIORITY

The present application claims priority under 35 U.S.C.§119 of U.S. Provisional Patent Application No. 60/431,600 filed Dec. 6, 2002.

FIELD OF THE INVENTION

The present invention is related to methods, program products, and systems for organizing virtual meetings.

BACKGROUND OF THE INVENTION

Methods are known for collaborating and for sharing data over a network. For example, methods are known for conducting so-called "virtual meetings" or video conferences over a network at which multiple participants on different remote computers can share data and interact. Participants may be able to communicate with one another visually and orally, for instance, using cameras and microphones.

A typical procedure for conducting a virtual meeting is to establish a temporary or permanent virtual "space" or "room" on the network into which meeting participants can "enter." In practice, this may involve allocating a meeting address or similar interface location on the network, and letting users know that address and a time to connect there. The meeting address may be, for example, a numeric string in the case of a packet-based network such as an internet protocol network and/or a port number.

Many meetings may be occurring between different users at different network interfaces and different times. Organizing a particular virtual meeting on the network can be difficult and cumbersome. Once a network interface location is selected, it must be communicated to all of the attendees, along with the time of the meeting. Other information may also need to be sent to all of the attendees. Attendees may need to know what applications, communication protocols, connectivity, bandwidth, and other communication and collaboration standards will be supported.

Security may also be a concern to insure that only those invited to the meeting can connect to it. This may require making sure that invited attendees do not pass along the connection information to other unwanted participants. The bandwidth required to carry the meeting may be required to be known. It will be appreciated that the cost, effort, and time associated with accomplishing these tasks grows steadily with the number of meeting attendees, and that for some meetings that include tens, hundreds, or even thousands of attendees, scheduling and enabling a virtual meeting can be so difficult as to be impractical.

Accordingly, unresolved needs in the art remain.

SUMMARY OF THE INVENTION

An exemplary method of the present invention is directed to a method for organizing a virtual meeting between a plurality of attendees on a computer network, and includes steps of selecting a meeting date, a meeting start time, meeting duration, and a meeting code, as well as storing the meeting date, meeting start time, meeting duration, and meeting code in a meeting file that is then stored in a memory that is accessible to the network. Steps of specifying at least one meeting attendee and of communicating a meeting invitation to the at least one attendee over the network are further performed. The invitation includes at least the meeting date, the meeting start time, the meeting code, and a meeting entry portal. The method further includes a step of allocating network resources for the meeting, the network resources sufficient to communicate a plurality of real time data streams over the network, the plurality of real time data streams including at least one real time video data streams and at least one real time audio data stream.

Methods and systems of the invention may be embodied in computers and computer program products. For example, an additional exemplary embodiment of the invention is a computer program product for organizing a virtual meeting between a plurality of attendees on a computer network, the program product including computer executable instructions stored on a computer readable medium that when executed cause the computer to receive a meeting code, a meeting date, a meeting start time, and the identity of a plurality of meeting attendees from a user submitted over the network, and to store the meeting code, meeting start time, and identity of the plurality of meeting attendees in a meeting file in a memory accessible from the network. The program instructions further cause the computer to determine the bandwidth required to communicate the meeting to each of said attendees, and to permit each of the plurality of meeting attendees to attend the meeting only if each of the plurality of meeting attendees has bandwidth resources sufficient to participate in the meeting.

Still an additional exemplary embodiment of the invention is directed to a method for determining the bandwidth resources for attendees of a virtual meeting conducted over a network. This exemplary method includes steps of determining what attendees will attend each of a plurality of meetings, determining what linkages each of the attendees is connected to the network with, determining whether any of the linkages are shared linkages that are shared by attendees of different of the plurality of meetings that are occurring at least partially concurrently with one another, and if they are shared linkages determining what bandwidth is available over said shared linkage for each of said attendees of different meetings.

DETAILED DESCRIPTION

One exemplary embodiment of the present invention is directed to a method and a program product for organizing a virtual meeting on a data network. As used herein, the term "virtual meeting" is intended to broadly refer to a real time audio/visual interaction between attendees not physically present in the same physical space. For example, a virtual meeting may be a video and audio conference between users that are remote from one another. They may be located, for instance, in different rooms in a facility, or in different cities around the world.

Figure 1:
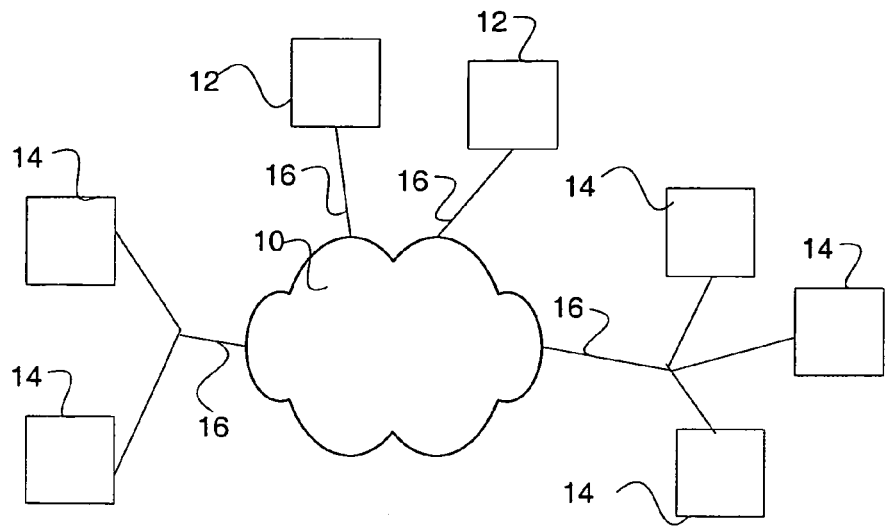
FIG. 1 is a schematic of a network useful for describing a method and program product of the invention.

FIGS. 1 and 2 are schematics of a network 10 and meeting conference rooms 12 and 14 that are useful to further describe an embodiment of the present invention. FIG. 1 shows a network 10 with a plurality of conference rooms 12 and 14 connected thereto over linkages 16. The rooms 12 and 14 may be considered to be substantially the same, except that the rooms 14 share a linkage 16 to the network 10, while each room 12 has a dedicated linkage 16. The conference rooms 12 and 14 may also be considered to be meeting attendees. The network 10 may be any suitable interconnection for communicating data between the conference rooms 12 and 14, with examples including a digital data network, the PSTN, a wireless network, and the like. A preferred network 10 for practicing the invention includes a digital network configured for carrying packet-based data, such as an internet protocol network. These networks are believed to show great promise for carrying efficient, low-cost, and highly immersive virtual meeting communications.

Figure 2B:
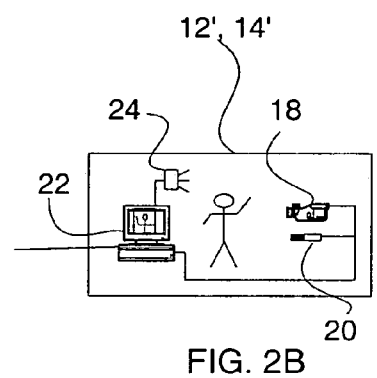
FIG. 2 is a schematic of a portion of the network of FIG. 1.
Figure 2A:
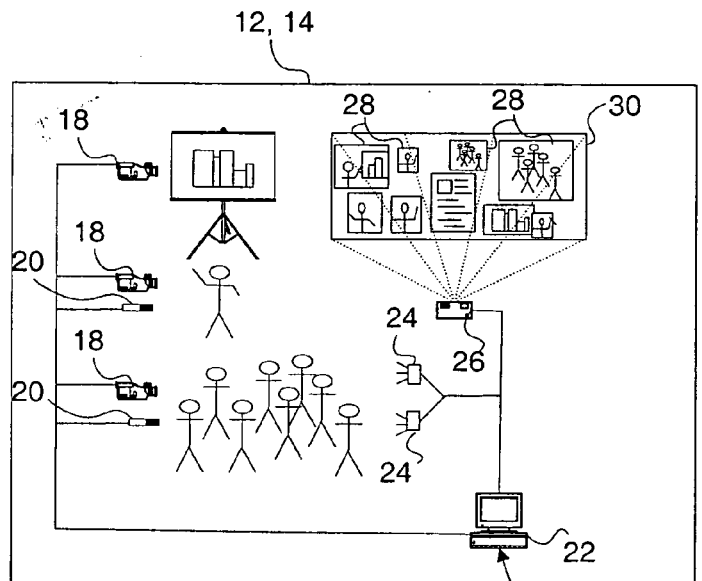

FIG. 2A is a schematic of an exemplary conference room 12 and 14. It generally includes a plurality of cameras 18 and a plurality of microphones 20 linked to a computer 22 that is connected to the network 10 by the linkage 16. The cameras and microphones 18 and 20 may be trained on a speaker, and audience, a display screen, and/or the like. During a virtual meeting, real time streams that include video and audio data from the cameras 20 and microphones 22 may be communicated from one conference room 12 or 14 to all of the other conference rooms 12 or 14 over the network 10.

In addition to communicating real time data streams to other conference rooms, each of the conference rooms 12 and 14 receives all of the video and audio streams in real-time from all of the other conference rooms 12 and 14. Audio streams played on the speakers 24, and video streams may be projected by one or more projectors 26 to display individual images 28 on a screen 30. An individual image 28 is preferably available from each of the cameras 18 at others of the rooms 12 and 14. Which images 28 are displayed and in what format can be controlled by the computer 22. In this manner, a virtual meeting may be conducted between all of the conference rooms 12 during which individuals 14 can all talk to one another, view one another, and share data in real time.

Other configurations for conference rooms 12 and 14 are also contemplated. FIG. 2B, for example, shows a scaled down room 12', 14' that includes only a single camera 18 and microphone 20. Images 28 are displayed on the computer 22 monitor, and a speaker 24 may be integral with the computer 22. This room 12' or 14' may be useful, for example to, to allow participation of a traveling salesman in a virtual meeting.

Figure 3A:
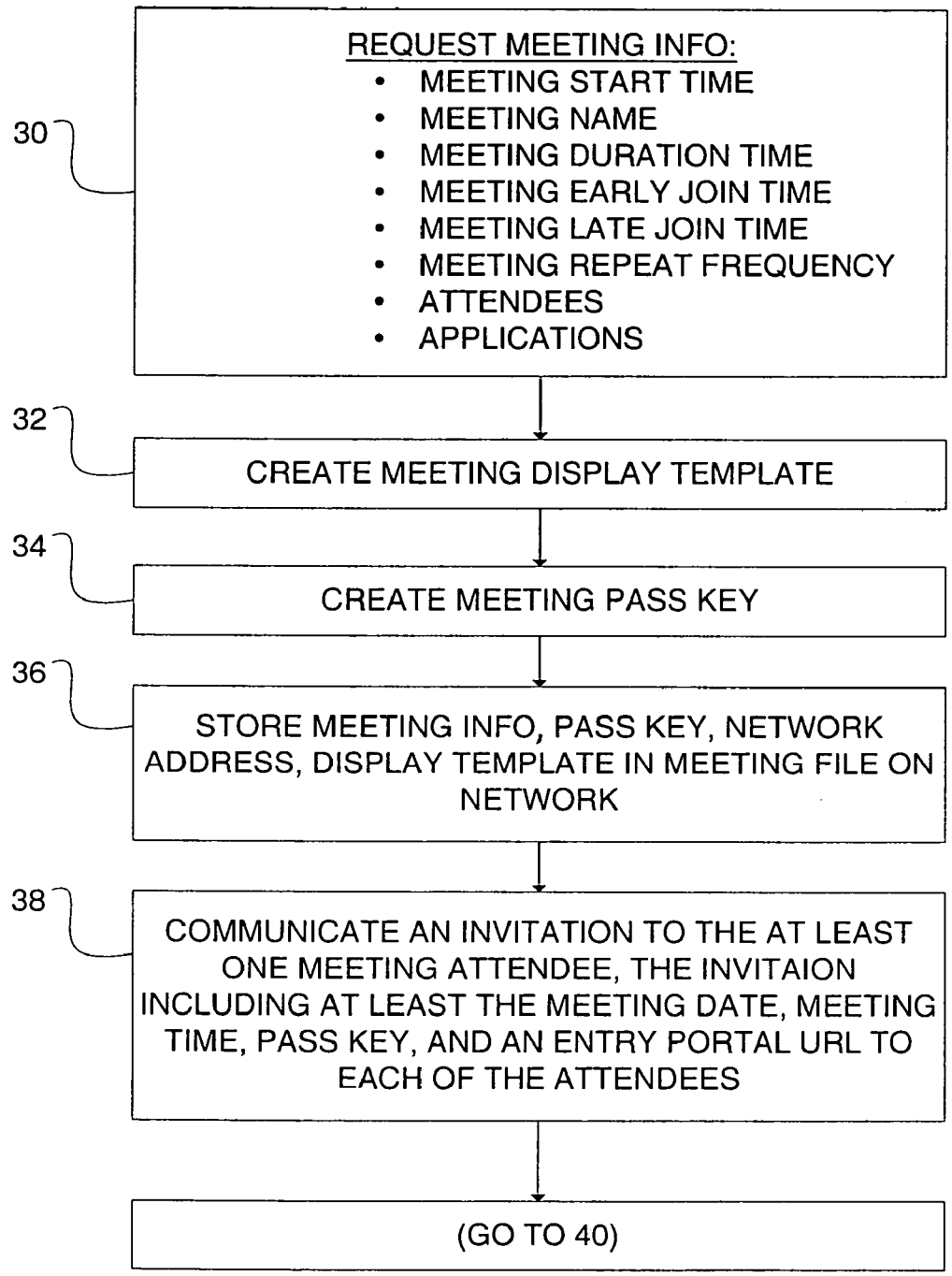
FIG. 3 is a flowchart of one exemplary method of the invention.
Figure 3B:
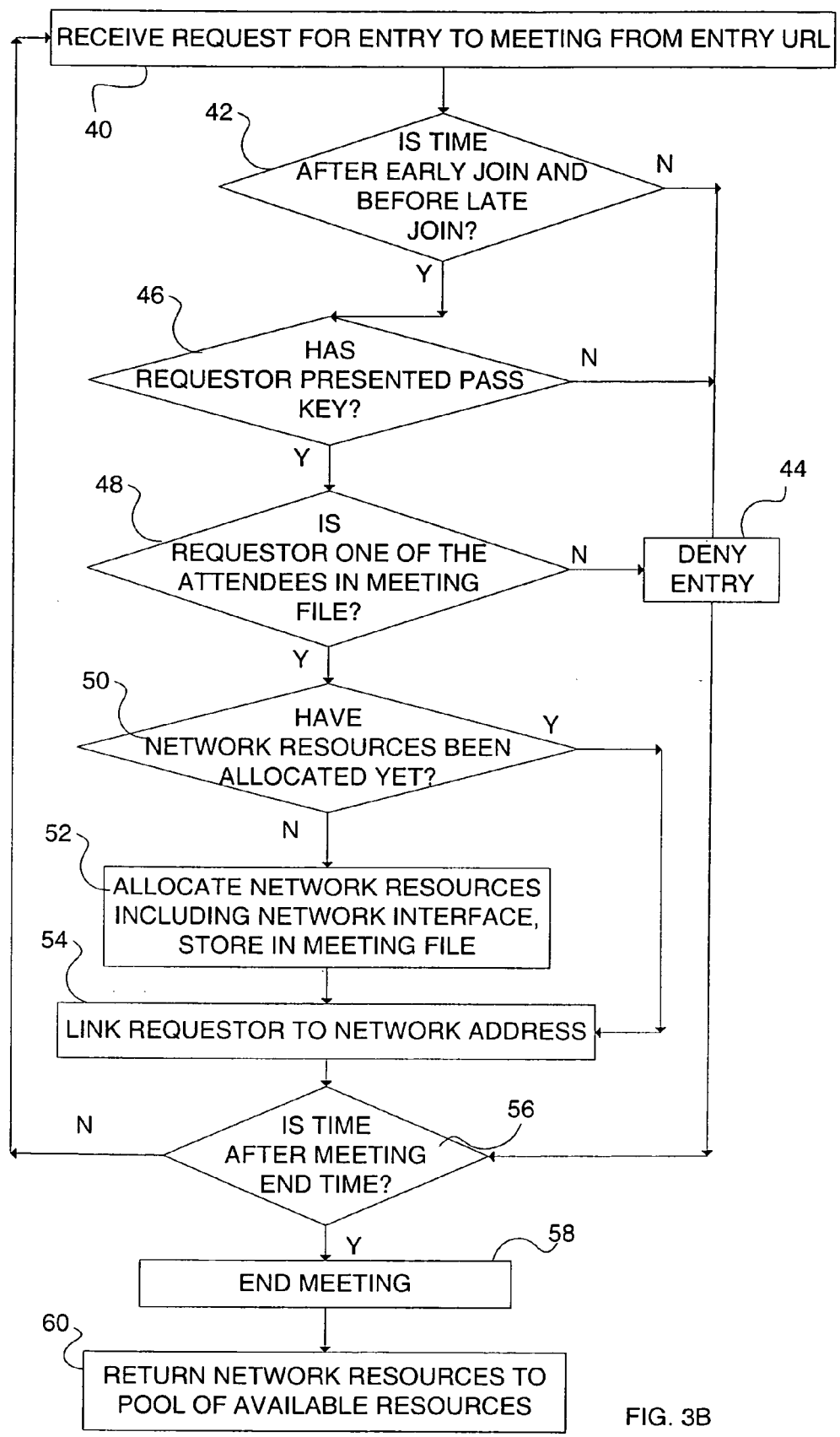

Through methods and program products of the invention, virtual meetings may be organized. The flowchart of FIG. 3 illustrates the steps of one exemplary method of the invention. When describing the method of FIG. 3, it will be appreciated that the present invention may be practiced in the form of a computer program product in addition to a method. Those knowledgeable in the art will appreciate that a program product of the invention may comprise computer executable instructions stored on a computer readable medium that when executed cause a computer to carry out the steps of a method of the invention. Accordingly, it will be appreciated that description herein of a method of the invention will also apply to a program product of the invention. Likewise, description of a computer program product of the invention may apply to a method of the invention.

Referring now to the flowchart of FIG. 3, a method of the invention includes a step of obtaining meeting information (block 30). The meeting information can be collected from an individual connected to the network, such as an operator of the computer 22 of FIGS. 2A and 2B, or from any other source connected to the network 10. The meeting information generally includes information needed to set-up the virtual meeting, and to let others know of the meeting. In an exemplary method of the invention, the meeting information includes:

Meeting code
Meeting Date
Meeting Start Time
Meeting Duration
Meeting Early Join Time
Meeting Late Join Time
Meeting Repeat Frequency
Attendees
Applications The Meeting Code is any data useful to identify the meeting. For example, a meeting code may be one or more words (e.g., "alpha product preliminary design meeting"), a random numeric string (e.g., "12232"), a date code (e.g., "12-03-03"), or other identifier. The "Meeting Date" is the date of the meeting, the "Meeting Start Time" is the time at which the meeting is to occur, and the "Meeting Duration" is the expected time that the meeting will last. The "Meeting Early Join Time" is a time period before the start time that attendees can begin checking into the meeting. For example, the early join time may be 15 mins, with the result that attendees could check into the meeting 15 mins or less before the meeting start time, but no earlier. Similarly, the "Meeting Late Join Time" specifies a period after the start time during which attendees can join the meeting. For example, a late join time of 10 mins. would result in attendees being able to check into the meeting up to 10 mins. after the start of the meeting.

The "Meeting Repeat Frequency" determines whether the meeting is a single, one-time meeting or may re-occur. The "Attendees" are the individuals to be invited to the meeting. The attendees may be identified using names, electronic addresses, or by other means that will allow for them to be electronically communicated with. Preferably a network address such as an e-mail address is provided. The "Applications" includes computer program and other applications that will be supported and may be used during the meeting. For example, Microsoft Word, Excel or PowerPoint are examples of applications that may be shared during the meeting.

Figure 4:
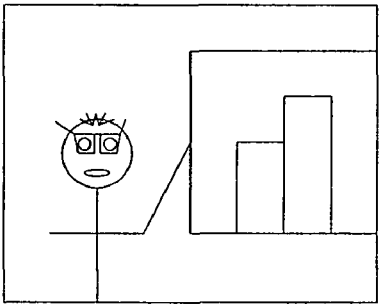
FIG. 4 is an exemplary graphic user interface useful for practice of the invention.

When practicing a method of the invention in the form of a computer program product, this step (block 30) may be carried out in the form of a graphic user interface (GUI) that prompts users to provide the meeting information. For example, FIG. 4 illustrates a GUI for receiving the meeting information in entry fields. The entry fields may be filled out by a user typing in characters, selecting items off of a drop-down or other menu, or the like. Also, additional GUI screens may be triggered by the GUI of FIG. 4. For example, if a user indicates that a meeting will be repeated, an additional screen may appear to enter information about the scheduling and details of the repeat meetings.

In another step of the exemplary method of the invention, a display template is created (block 32). A display template provides a defined screen template for display of meeting data on the users computer monitors. For example, a particular data stream may be identified as a main or "primary stream" for display in the largest size and a defined position on the screen. A display template may also specify application geometry for displaying images. It may specify, for example, at what position and size images appear for various applications. A drawing application whiteboard may be specified to be placed at the left hand side of the display, a particular video stream in the center, and a chat screen for text on the right hand side of the display. Particular sizes, colors, borders, and other details for each of the images may be specified by the display template.

Figure 5:
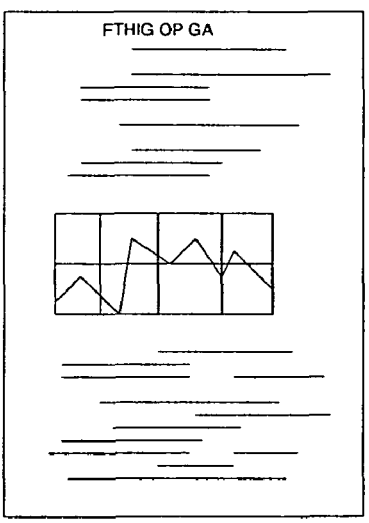
FIG. 5 is an exemplary display template useful for practice of the invention.
Figure 6:
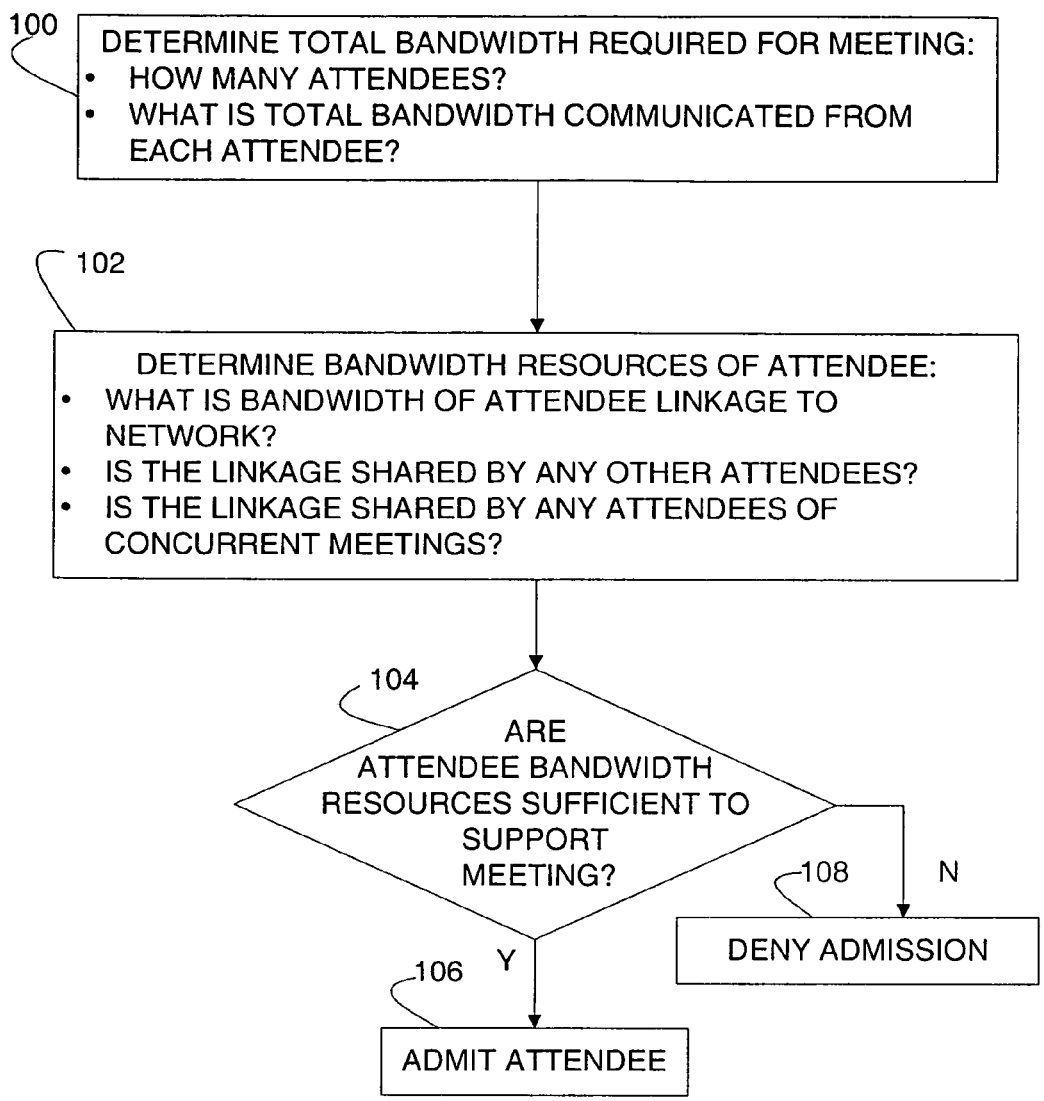
FIG. 6 is a flowchart showing steps of a portion of one exemplary method of the invention; and, FIG. 7 is a time chart useful to illustrate the steps of FIG. 6.

FIG. 5 is an example of a display template. It will be appreciated that when a large number of attendees are participating in a virtual meeting, a display template can be useful to organize the meeting and make each attendee's experience consistent. Creation of a display template through a method of the invention may comprise a user selecting one of a set of templates from a drop down selection menu or other list, or may include selecting particular video/audio or data streams to highlight.

The exemplary method of the invention further includes the step of creating a pass key for the meeting. As used herein, the term "pass key" is intended to be broadly interpreted as a security device for selective entry to the meeting. For example, a pass key may be a password, a virtual "certificate," or the like. This provides an additional level of security over the meeting code.

The pass key may be included in the meeting information. With reference to the GUI of FIG. 4, for example, it will be appreciated that in gathering the meeting information the GUI may prompt a user to create a password. Thus a pass key is created upon entry of the password. In other embodiments of the invention, the pass key may be created from the meeting code. For example, the meeting code may serve as the pass key. In still other invention embodiments, creation of a pass key may comprise random or other logical generation of a password and display of that generated password to the user.

The pass key and meeting information are then stored in a meeting file on the network (block 36). The pass key and meeting information may be stored in a meeting file in the form of a spreadsheet, relational database, or other form. An invitation is then communicated to each attendee (block 38). The exemplary invitation includes the meeting code, the meeting date, the meeting time, the pass key, and a meeting entry portal. As used herein, the term meeting entry portal is intended to broadly refer to an electronic address from which an attendee may be linked to the meeting. For example, a meeting entry portal may be a world wide web URL (Uniform Resource Locator), an IP address, or a network interface location from which the attendee will be linked to the meeting. The invitation may be sent in an encrypted form for security. Also, in some invention embodiments the pass key may be sent separately from the invitation in a second communication to lower the risk of invitation interception resulting in un-invited attendees.

In still another embodiment of the invention, the invitation may be an executable file that upon execution takes all steps necessary to link an attendee to the virtual meeting. For example, the invitation file would launch an application required to participate in the meeting, would connect to the meeting entry portal and would present the passkey. Further, the invitation file can be pre-set to self-execute at the meeting start time.

In the exemplary method of the invention, the next step occurs when the meeting begins. A first attendee connects to the meeting entry portal and requests admission to the meeting (block 40). This may occur, for instance, when an attendee 14 at one of the conference rooms 12 connects to the URL entry portal that was included in the invitation communicated to him. Through the method of the invention, it will be determined if the time is between the early join time and the late join time (block 42). If not, entry will be denied (block 44). If so, it will be determined if the requestor has presented the correct pass key (block 46). If not, entry is denied (block 44).

If so, it will be determined if the requestor is one of the attendees identified in the meeting info file (block 48). This may be done by comparing names, electronic addresses, or like identification information. For example, each attendee may be identified in the meeting info file by an IP address for origination of communications. Referring to FIG. 1, for instance, each computer 22 at each conference room 12, 14 may have an IP address associated with it, and this may be used to identify the attendees. The step of block 48 can be desirable to provide another level of security check in addition to the meeting code and the pass key. Pass keys and meeting codes may be communicated to unwanted attendees, for instance.

If the requestor has passed all of the hurdles presented to this point, he is suitable for entry to the meeting. Through the method of the invention, it will next be determined if network resources have been allocated for the meeting (block 50). If not, they are allocated (block 52). The term "network resources" as used herein is intended to broadly refer to network hardware, software and other resources that are required to support the communications between meeting attendees during the meeting. Preferably, the network resources include at least one or more network interfaces for linking the attendees to one another. The term "network interface" as used herein is intended to be broadly interpreted as meaning a device useful to link electronic communications for different users to one another. It may be, for example, one or more bridges, network cards, computer servers or routers, or the like.

The network interface may have an address such as an IP address and/or a port number at which it can be communicated with. In an exemplary method of the invention, the network interface address is an IP address and ports of a bridge on the network 10 (FIG. 1) useful to link the conference rooms 12, 14 to one another. In an exemplary method of the invention, the network resources, including a network interface, is selected from a list or pool of available resources. At the conclusion of a meeting, the resources are returned to the pool. This allows for dynamic assignment of resources.

If network resources have already been allocated, the requestor is linked from the URL entry portal to the meeting address (block 54). For example, if the requestor is a second or subsequent attendee, then the network resources have presumably been allocated already. Also, in other invention embodiments the meeting address for the meeting may be the entry portal location.

In this manner the exemplary method of the invention only allocates a meeting address at the beginning of the meeting. That is, only when a first attendee requests entry to the meeting is the meeting address allocated. Second and subsequent attendees are then linked to that allocated address. It has been discovered that these preferred steps are advantageous for purposes of allowing meeting addresses to remain freely available until required. When resources are limited, this may be of particular benefit. Also, use of a meeting entry portal that is separate from the meeting address at which the meeting will be conducted has been found to offer benefits and advantages. The meeting entry portal can be constant from meeting to meeting, while the meeting address for the meetings is not required to be.

It will be appreciated that other embodiments of the invention may include other steps regarding the meeting entry portal and of allocating a meeting address at other times. For example, in some circumstances it may be preferable to simply use the meeting address as the meeting entry portal. That is, the meeting entry portal is the same as the meeting address. In these circumstances the invitation would include the meeting address (i.e., the meeting entry portal) for the meeting, and attendees would connect directly thereto. Also, in still other embodiments of the invention, the time at which the meeting address is allocated may be different than that illustrated in FIG. 3. For example, it may be desirable to allocate a meeting address when the meeting info is gathered, or soon after. When the meeting info is stored in a file on the network the meeting address may be allocated and then stored in the file. Once the meeting is begun, the selected display template may be used, and the selected applications may be supported.

The exemplary method of the invention also includes steps for ending the meeting. In particular, after admitting attendees to the meeting, the method includes a step of checking to see if the meeting duration has expired (block 56). If so, the meeting is ended (block 58). If not, it is determined if the time is after the late join time (block 60). If not, the method returns to block 40 to wait for additional requesters. If it is too late for requestors to be admitted to the meeting, the exemplary method of the invention remains in a loop until the meeting duration time is exceeded, when the meeting is ended (block 58).

In considering the flowchart of FIG. 3, it will be appreciated that this is exemplary only, and that many different logical schemes can be practiced within the method of the invention. For example, many different permutations of the sequence of the steps described in FIG. 3 are possible. It will also be appreciated that methods of the invention may include additional or alternate steps.

By way of particular example, an additional exemplary method of the invention includes one or more steps of determining the required bandwidth between the network 10 and each conference room 12, 14 to carry the virtual meeting. To determine the total required bandwidth, factors such as the number of conference rooms 12 and 14, the number of data streams being communicated from each conference room 12 and 14, the applications being supported, other meetings being conducted concurrently with the meeting, and the like may be considered.

By way of further example, FIG. 5 illustrates steps of determining required bandwidth. To determine the total bandwidth required for the meeting, the total number of attendees and the total number of data streams communicated from each attendee may be considered (block 100). The total bandwidth required may simply be the sum of all individual streams. The total required bandwidth may also include other components, such as a safety factor surplus, administrative overhead required to monitor streams and/or to manage the meeting, and the like. The step 100 may be carried out as each attendee is joined to the meeting, during initial set-up of the meeting, or at another time as may be desired.

The exemplary method of FIG. 5 further includes a step of determining the bandwidth resources of each attendee (step 102). This may be determined by considering the bandwidth of the linkage 16 (FIG. 1) between the network and the attendee. The bandwidth of the linkage 16 may be determined through querying of an attendee, through electronic querying of the linkage, by recalling prior stored data, or the like. The step of determining the bandwidth resources of each attendee of block 102 may further include consideration of other factors such as any additional traffic anticipated to be on that linkage during the time of the meeting. For example, if the meeting attendee is one of the conference rooms 14 of FIG. 1 that shares a linkage 16, then the step 102 will consider whether another conference room 14 on that linkage 16 is scheduled to participate in the meeting. If so, then that shared linkage must support communication of two sets of virtual meeting data streams, and the bandwidth available to each of the attendees over that shared linkage will be less than the total bandwidth of the linkage.

Figure 7:
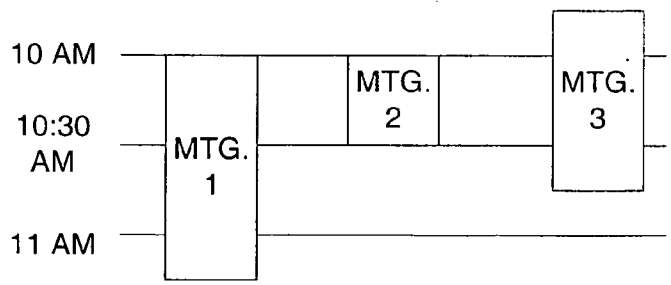

The method step of block 102 may further include determining whether the linkage is shared by any attendees of other meetings that are occurring concurrently with the meeting of interest. This may be accomplished by referring to a stored master meeting file, or to another stored listing that includes times and attendees of different meetings. FIG. 7, for example, illustrates a time-plot that shows several different meetings that are at least partially concurrent with one another. By knowing which attendees are participating in each of these meetings, and by knowing what linkages 16 each of those attendees are connected to the network 10 with (FIG. 1), the total bandwidth consumed for each meeting over each particular linkage 16 can be determined. The step 102 of FIG. 5 may include retrieving and using this information to determine the bandwidth available to communicate with each attendee.

Once the total bandwidth required for the meeting and the bandwidth available to communicate with each attendee have been determined, a decision is made as to whether a particular attendee has sufficient bandwidth to be admitted to the meeting (block 104). If the attendee has sufficient bandwidth, he is admitted (block 106); if not admission is denied (block 108). In another invention embodiment, denying admission to the meeting may be replaced by a step of directing the particular attendee to a lower bandwidth linkage to the meeting. For example, the attendee may be directed or automatically linked to network interface that is only carrying a subset of the overall data streams communicated during the meeting.

Referring once again to the flow chart of FIG. 3, the required bandwidth may be included in the meeting file, as may the bandwidth resources of each of the attendees. Additional steps of using this information may also be performed. For instance, the required bandwidth may be included in the meeting invitation so that an attendee can determine whether or not they have adequate bandwidth to participate in the meeting. Further, a step may be performed of denying admission or denying communication of an invitation to a requestor if the requester does not have adequate bandwidth to participate. The requestor's bandwidth may be pre-known through existing knowledge of the requestor's identity, may be determined by querying the requester, may be determined by performing an automated discovery, or like steps.

Other variations and alternate steps of the method of the invention will likewise be apparent to those knowledgeable in the art, and will be understood to be within the scope of the invention. Those knowledgeable in the art will appreciate that description of invention embodiments made herein are by way of example only. For example, although an invention embodiment has been illustrated with only a relatively small number of conference rooms 12 and 14, it will be appreciated that there is no practical limit to the number of conference rooms that the invention may be practiced with. Also, the particular configuration of the conference rooms illustrated is exemplary only. For example, they are meant only to represent the physical location and electronic connectivity of attendees. They may be, for example, a motel room with a camera equipped laptop for a traveling salesman attendee, or may be a camera equipped wireless phone in an attendee's hand.

Embodiments of the present invention thereby provide elegant and beneficial solutions to problems of the prior art. For example, methods and program products are provided for the convenient, automated, and efficient organization of virtual meetings.

What is claimed is:

1. A method for organizing a virtual meeting between a plurality of attendees on a computer network, the method comprising the steps of:
   selecting a meeting date, a meeting start time, meeting duration, and a meeting code, storing said meeting date, said meeting start time, said meeting duration, and said meeting code in a meeting file;
   storing said meeting file in a memory accessible to the network;
   communicating a meeting invitation to said plurality of attendees over the network, said invitation including at least said meeting date, said meeting start time, said meeting code, and a meeting entry portal,
   receiving a request to join the meeting from a first of said plurality of attendees;
   allocating network resources for said meeting after receiving said request to join said meeting from said first of said plurality of attendees, said network resources including at least one IP address and at least one port for a network interface connected to the network for connecting said plurality of attendees for communication with one another during the meeting, said network resources sufficient to communicate a plurality of real time data streams over the network, said plurality of real time data streams including at least one real time video data stream and at least one real time audio data stream
   determining the total bandwidth available to communicate with each of said plurality of attendees through consideration of whether additional traffic unrelated to the virtual meeting will be carried over a linkage connecting said each of said plurality of attendees to the virtual meeting
   wherein the virtual meeting is a first virtual meeting, and wherein the step of determining the total bandwidth to communicate with each of said plurality of attendees includes determining whether a second virtual meeting may consume bandwidth resources of said attendee, and wherein said first and second meetings are different from one another.

2. A method as defined by claim 1 and further including the step of determining a required bandwidth for the meeting and storing said required bandwidth in said meeting file.

3. A method as defined by claim 1 wherein each of said plurality of meeting attendees will be streaming a plurality of real time data streams to the meeting, and wherein the method further includes the step of determining the bandwidth required for each of said plurality of real time data streams.

4. A method as defined by claim 3 further including the step of determining the total bandwidth required for the virtual meeting by summing the bandwidth required for each of said plurality of real time data streams from each of said plurality of attendees.

5. A method as defined by claim 4 wherein said plurality of real time data streams includes at least a plurality of video data streams and at least one audio data stream.

6. A method as defined by claim 1 wherein at least one of said plurality of attendees is linked to the network by a linkage shared by an attendee of said second virtual meeting, said second virtual meeting being at least partially concurrent with said first virtual meeting.

7. A method as defined by claim 1 and further including the steps of:
   determining what linkage each of said plurality of attendees is connected to the network with; and,
   determining whether any additional of said plurality of attendees are connected to the network over said linkage.

8. A method as defined by claim 1 wherein the virtual meeting is the first virtual meeting and further including the steps of:
   determining what linkage each of said plurality of attendees is connected to the network with;
   determining whether any other virtual meetings are occurring at least partially concurrently with the first virtual meeting, wherein said first and second meetings are different from one another; and,
   determining whether any attendees of any of said other virtual meetings are connected to the network over said linkage.

9. A method as defined by claim 1 and further including the steps of determining the total bandwidth of each of said plurality of meeting attendees, and of limiting said meeting attendees to only those having sufficient bandwidth to participate in said meeting.

10. A method as defined by claim 1 and further including the steps of determining the total required bandwidth for the meeting, of determining the total available bandwidth of each of said plurality of meeting attendees, and of directing any attendees that do not have sufficient bandwidth available to link to a subset of said plurality of data streams being communicated during the meeting.

11. A method as defined by claim 1 wherein said meeting file further includes at least one application to be used during the meeting.

12. A method as defined by claim 1 wherein said invitation is an executable file that upon execution takes steps necessary to connect to said virtual meeting.

13. A method as defined by claim 1 wherein said meeting file further specifies a display template for displaying video streams during the meeting.

14. A method as defined by claim 13 wherein said display template includes application geometry for displaying images.

15. A method as defined by claim 1 and further including the step of selecting a display template for displaying at least one video data stream during the meeting.

16. A method as defined by claim 1 and further including the steps of linking each remaining of said plurality of users to said meeting resources when a request for entry is received from said remaining of said plurality of users.

17. A method as defined by claim 1 wherein said network resources include at least one network interface having an address, and further including storing said at least one network interface address in said meeting file.

18. A method as defined by claim 1 wherein the step of allocating said network resources for said meeting comprises selecting said network resources from a list of available network resources.

19. A method as defined by claim 1 wherein said network resources include at least one network interface address, and further including the step of storing said at least one network interface address in said meeting file.

20. A method as defined by claim 1 wherein said meeting entry portal is a URL and wherein said network interface location is different from said meeting entry portal URL.

21. A method as defined by claim 1 and further including the step of specifying an early join time before said start time before which said at least one attendee cannot join the meeting and a late time after which said at least one attendee cannot join the meeting.

22. A method as defined by claim 1 and further including the step of providing a network address for each of said plurality of meeting attendees.

23. A method as defined by claim 1 and further including the steps of creating a pass key for entry to said meeting, of including said pass key with said invitation communicated to said plurality of attendees, and of storing said pass key in said meeting file.

24. A method as defined by claim 1 and further including the steps of determining the IP address of each of said plurality of meeting attendees, and of limiting said meeting attendees to only those having an IP address listed in said meeting file.

25. A method as defined by claim 1 and further including the steps of creating a pass key for entry to said meeting and sending said pass key to said plurality of attendees in a communication separate from said meeting invitation communication.

26. A method as defined by claim 1 and further including the steps of:
  receiving a request to join the meeting from a second and third of said plurality of meeting attendees;
  determining that said second and third of said plurality of meeting attendees have sufficient bandwidth available to attend said meeting, and connecting said second and third of said plurality of attendees to said meeting wherein said second and third attendees share said plurality of real time data streams with one another and said first of said plurality of meeting attendees;
  receiving a request to join the meeting from a fourth of said plurality of meeting attendees; and
  determining that said fourth of said plurality of meeting attendees does not have sufficient bandwidth available to attend said meeting, and denying admission to said fourth of said plurality of meeting attendees.

27. A method as defined by claim 1 and further including the steps of:
  determining the bandwidth required for each of said plurality of attendees wherein each of said plurality of meeting attendees will be streaming a plurality of real time data streams to the meeting;
  determining the total bandwidth required for the virtual meeting by summing the bandwidth required for each of said plurality of real time data streams from each of said plurality of attendees;
  determining if each of said plurality of meeting attendees has sufficient bandwidth available to attend said meeting; and
  directing any attendees that do not have sufficient bandwidth available to link to a subset of said plurality of data streams being communicated during the meeting.

28. A computer program product for organizing a virtual meeting between a plurality of attendees on a computer network, the program product including computer executable instructions stored on a computer readable medium that when executed cause the computer to:
  receive a meeting code, a meeting date, a meeting start time, and the identity of a plurality of meeting attendees from a user submitted over the network;
  store said meeting code, said meeting start time, and said identity of said plurality of meeting attendees in a meeting file in a memory accessible to the network;
  communicate an invitation to each of said plurality of meeting attendees, said invitation including at least said meeting start time, said meeting code, and an entry portal for entering the meeting;
  receive a first request to enter the meeting from a first of said plurality of meeting attendees after said first attendee has connected to said entry portal, allocating at least one IP address and at least one port linked to a network interface location for the meeting after receiving said first request, said at least one network interface location sufficient to link a plurality of real time video streams and at least one real time audio stream between each of said plurality of meeting attendees, storing said at least one network interface location in said meeting file, linking said first meeting attendee to said network interface;
  receiving a subsequent request from a second of said plurality of meeting attendees, and linking said second meeting attendee to said network location; and
  determining the total bandwidth of each of said plurality of meeting attendees, and limiting said meeting attendees to only those having sufficient bandwidth to participate in said meeting;
  determining the total bandwidth required to participate in said meeting, and the bandwidth available to communicate with each of said plurality of meeting attendees
  wherein the product is for organizing a plurality of different meetings, wherein said meeting is a first meeting, and wherein the program instructions cause the computer to determine what linkage connects each of said plurality of attendees to the network with, and whether said linkage is shared by any other of said plurality of attendees or shared by attendees of a different second meeting occurring concurrently with said first meeting.

29. A computer program product as defined by claim 28 wherein said invitation comprises an executable file that when executed performs steps sufficient to connect said each of said plurality of attendees to said virtual meeting.

30. A computer program product as defined by claim 28 wherein the program instructions further cause the computer to receive a display template selection, said display template including at least a specified display location and size for at least one video stream, and to use said display template during the meeting.

31. A computer program product as defined by claim 28 wherein the program instructions when executed further cause the computer to determine the bandwidth resources for each of said plurality of meeting attendees.

* * * * *